(12) United States Patent
Broerman et al.

(10) Patent No.: US 9,015,781 B2
(45) Date of Patent: Apr. 21, 2015

(54) METHODS AND APPARATUSES FOR PROVIDING LOAD BALANCED SIGNAL DISTRIBUTION

(75) Inventors: Keith Robert Broerman, Carmel, IN (US); Barry Jay Weber, Carmel, IN (US); Gary Robert Gutknecht, Noblesville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 482 days.

(21) Appl. No.: 12/735,933

(22) PCT Filed: Dec. 12, 2008

(86) PCT No.: PCT/US2008/013640
§ 371 (c)(1),
(2), (4) Date: Aug. 26, 2010

(87) PCT Pub. No.: WO2009/108176
PCT Pub. Date: Sep. 3, 2009

(65) Prior Publication Data
US 2010/0333150 A1    Dec. 30, 2010

Related U.S. Application Data

(60) Provisional application No. 61/067,585, filed on Feb. 29, 2008.

(51) Int. Cl.
*H04N 7/173* (2011.01)
*H04L 29/08* (2006.01)
(Continued)

(52) U.S. Cl.
CPC ...... *H04L 67/1008* (2013.01); *H04N 21/26216* (2013.01); *H04N 21/4424* (2013.01);
(Continued)

(58) Field of Classification Search
CPC .......... H04N 21/262; H04N 21/26216; H04N 21/44227; H04N 21/4424; H04N 21/443; H04N 21/4432; H04L 29/08963
USPC .................................. 725/82, 96, 78, 100, 95
See application file for complete search history.

(56) References Cited

U.S. PATENT DOCUMENTS 5,761,416 A * 6/1998 Mandal et al. ................. 709/250
6,195,680 B1   2/2001 Goldszmidt et al.
(Continued)

FOREIGN PATENT DOCUMENTS

| CN | 101084682 A | 12/2007 |
|---|---|---|
| EP | 1619853 A1 | 1/2006 |

(Continued)

OTHER PUBLICATIONS

International Search Report, dated Mar. 23, 2009.

*Primary Examiner* — Pankaj Kumar
*Assistant Examiner* — Timothy Newlin
(74) *Attorney, Agent, or Firm* — Robert D. Shedd; Reitseng Lin

(57) ABSTRACT

Methods and apparatuses provide load balanced signal distribution to client devices in a network, such as a digital home network. According to an exemplary embodiment, one of the methods includes the steps of receiving a request from a client device for downloading video from one of a plurality of video sources, receiving respective load indicators from first and second video receiving devices capable of receiving the plurality of video sources, selecting one of the first and second video receiving devices according to the load indicators, and instructing the selected video receiving device to transmit the video from the one of the plurality of video sources using an address known by the client device.

34 Claims, 5 Drawing Sheets

(51) Int. Cl.
  *H04N 21/262* (2011.01)
  *H04N 21/442* (2011.01)
  *H04L 29/06* (2006.01)

(52) U.S. Cl.
  CPC .......... *H04L65/608* (2013.01); *H04L 65/4084* (2013.01); *H04N 21/262* (2013.01); *H04L 67/1002* (2013.01); *H04N 21/44227* (2013.01); *H04L 65/4092* (2013.01)

(56) References Cited

U.S. PATENT DOCUMENTS

| | | | |
|---|---|---|---|
| 6,889,385 B1* | 5/2005 | Rakib et al. | 725/119 |
| 7,133,922 B1* | 11/2006 | She et al. | 709/231 |
| 2003/0009761 A1* | 1/2003 | Miller et al. | 725/76 |
| 2003/0174648 A1* | 9/2003 | Wang et al. | 370/235 |
| 2003/0212784 A1* | 11/2003 | Nguyen | 709/224 |
| 2004/0261116 A1* | 12/2004 | Mckeown et al. | 725/109 |
| 2005/0039213 A1* | 2/2005 | Matarese et al. | 725/95 |
| 2005/0071882 A1* | 3/2005 | Rodriguez et al. | 725/95 |
| 2005/0250511 A1 | 11/2005 | Xiao et al. | |
| 2005/0283818 A1* | 12/2005 | Zimmermann et al. | 725/134 |
| 2006/0035610 A1 | 2/2006 | Potrebic | |
| 2007/0027017 A1 | 2/2007 | Hachitani | |
| 2007/0027983 A1 | 2/2007 | Bowra et al. | |
| 2007/0174287 A1 | 7/2007 | McEnroe et al. | |
| 2009/0025042 A1 | 1/2009 | Lubbers et al. | |
| 2009/0222875 A1 | 9/2009 | Cheng et al. | |
| 2009/0235317 A1* | 9/2009 | Igarashi | 725/82 |
| 2010/0050215 A1* | 2/2010 | Wester et al. | 725/82 |

FOREIGN PATENT DOCUMENTS

| | | |
|---|---|---|
| JP | 20047592 | 1/2004 |
| JP | 2004-80566 | 3/2004 |
| JP | 2004158969 | 6/2004 |
| JP | 2008508807 | 3/2008 |
| JP | 2008510367 | 4/2008 |
| JP | 2008-530830 | 8/2008 |
| JP | 2008536419 | 9/2008 |
| JP | 2009503680 | 1/2009 |
| JP | 2009-520421 | 5/2009 |
| JP | 2009524346 | 6/2009 |
| WO | WO01/22688 A1 | 3/2001 |
| WO | 2005/002062 A2 | 1/2005 |
| WO | 2005020621 | 3/2005 |
| WO | WO2006015186 | 2/2006 |
| WO | 2006/137894 A2 | 12/2006 |
| WO | 2007/071560 A1 | 6/2007 |

* cited by examiner

METHODS AND APPARATUSES FOR PROVIDING LOAD BALANCED SIGNAL DISTRIBUTION

CROSS REFERENCE TO RELATED APPLICATION

This application claims the benefit, under 35 U.S.C. §365 of International Application PCT/US2008/013640, filed Dec. 12, 2008, which was published in accordance with PCT Article 21(2) on Sep. 3, 2009 in English and which claims the benefit of United States provisional patent application No. 61/067585, filed Feb. 29, 2008.

BACKGROUND OF THE INVENTION

1. Field of the Invention

The present invention generally relates to signal distribution in a network such as a digital home network, and more particularly, to methods and apparatuses for providing load balanced signal distribution to client devices in such a network.

2. Background Information

Signal distribution networks, such as digital home networks, have become increasingly popular in today's society. For example, in a digital home network that receives audio and/or video signals from a signal source such as a satellite, devices/apparatuses known as "gateways" are often used to distribute signals to client devices, which may for example be embodied as set-top boxes (STBs).

One problem associated with conventional satellite gateway systems is that they do not support splitting satellite network feeds across multiple gateways. That is, a given network can be sourced from only one gateway at a time. Additionally, assuming relatively high bit rates (e.g., A3, etc.) and high definition content, a conventional system can easily result in a gateway exceeding its total output bandwidth at its output interface. For example, assuming a peak stream bit rate of 18 megabits per second, just 40 different H.264 streams are enough to consume an aggregate of 700-800 megabits per second on a GEI0 (i.e., Gigabit Ethernet Interface port 0) interface. In addition, when including spot beams, some satellite networks have more than 32 transponders and a transponder can support several video and audio channels. The inability to split such a network across multiple gateways means that a conventional system cannot simultaneously tune all its transponders.

The present invention described herein addresses the foregoing and/or other issues, and in particular, provides a new architecture that is capable of, among other things, preventing over-subscription of the output interface of a gateway, as well as providing flexibility in supporting new networks, larger numbers of satellite transponders, larger numbers of client devices, and gateway redundancy.

SUMMARY OF THE INVENTION

In accordance with an aspect of the present invention, a method is disclosed. According to an exemplary embodiment, the method comprises the steps of receiving a request from a client device for downloading video from one of a plurality of video sources, receiving respective load indicators from first and second video receiving devices capable of receiving the plurality of video sources, selecting one of the first and second video receiving devices according to the load indicators, and instructing the selected video receiving device to transmit the video from the one of the plurality of video sources using an address known by the client device.

In accordance with another aspect of the present invention, an apparatus is disclosed. According to an exemplary embodiment, the apparatus comprises means such as a first input for receiving a request from a client device for downloading video from one of a plurality of video sources, means such as a second input for receiving respective load indicators from first and second video receiving devices capable of receiving the plurality of video sources, means such as first control logic for selecting one of the first and second video receiving devices according to the load indicators, and means such as second control logic for instructing the selected video receiving device to transmit the video from the one of the plurality of video sources using an address known by the client device.

In accordance with yet another aspect of the present invention, another method is disclosed. According to an exemplary embodiment, the method comprises the steps of sending a load indicator from a video receiving device capable of receiving a plurality of video sources to a request server device, wherein the load indicator indicates a load associated with the video receiving device; receiving from the request server device, data indicating a requested program and a destination address of a client device associated with the requested program; and transmitting the requested program to the destination address.

In accordance with still another aspect of the present invention, another apparatus is disclosed. According to an exemplary embodiment, the apparatus comprises means such as control logic for determining a load indicator indicating a load associated with the apparatus; means such as an interface for sending the load indicator to a request server device; and wherein, in response to the load indicator, data indicating a requested program and a destination address of a client device associated with the requested program is received from the request server device, and the apparatus transmits the requested program to the destination address.

In accordance with yet another aspect of the present invention, another method is disclosed. According to an exemplary embodiment, the method comprises the steps of sending a request for a program from a client device to a request server device, receiving an address at the client device from the request server device in response to the request, receiving the requested program at the client device via a selected video receiving device using the address, and wherein the request server device selects the selected video receiving device from among a plurality of video receiving devices based on respective load indicators from the plurality of video receiving devices.

In accordance with still another aspect of the present invention, another apparatus is disclosed. According to an exemplary embodiment, the apparatus comprises means such as an output for sending a request for a program to a request server device; means such as an input for receiving an address from the request server device in response to the request and for receiving the requested program via a selected video receiving device using the address; and wherein the request server device selects the selected video receiving device from among a plurality of video receiving devices based on respective load indicators from the plurality of video receiving devices.

BRIEF DESCRIPTION OF THE DRAWINGS

The above-mentioned and other features and advantages of this invention, and the manner of attaining them, will become more apparent and the invention will be better understood by reference to the following is description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
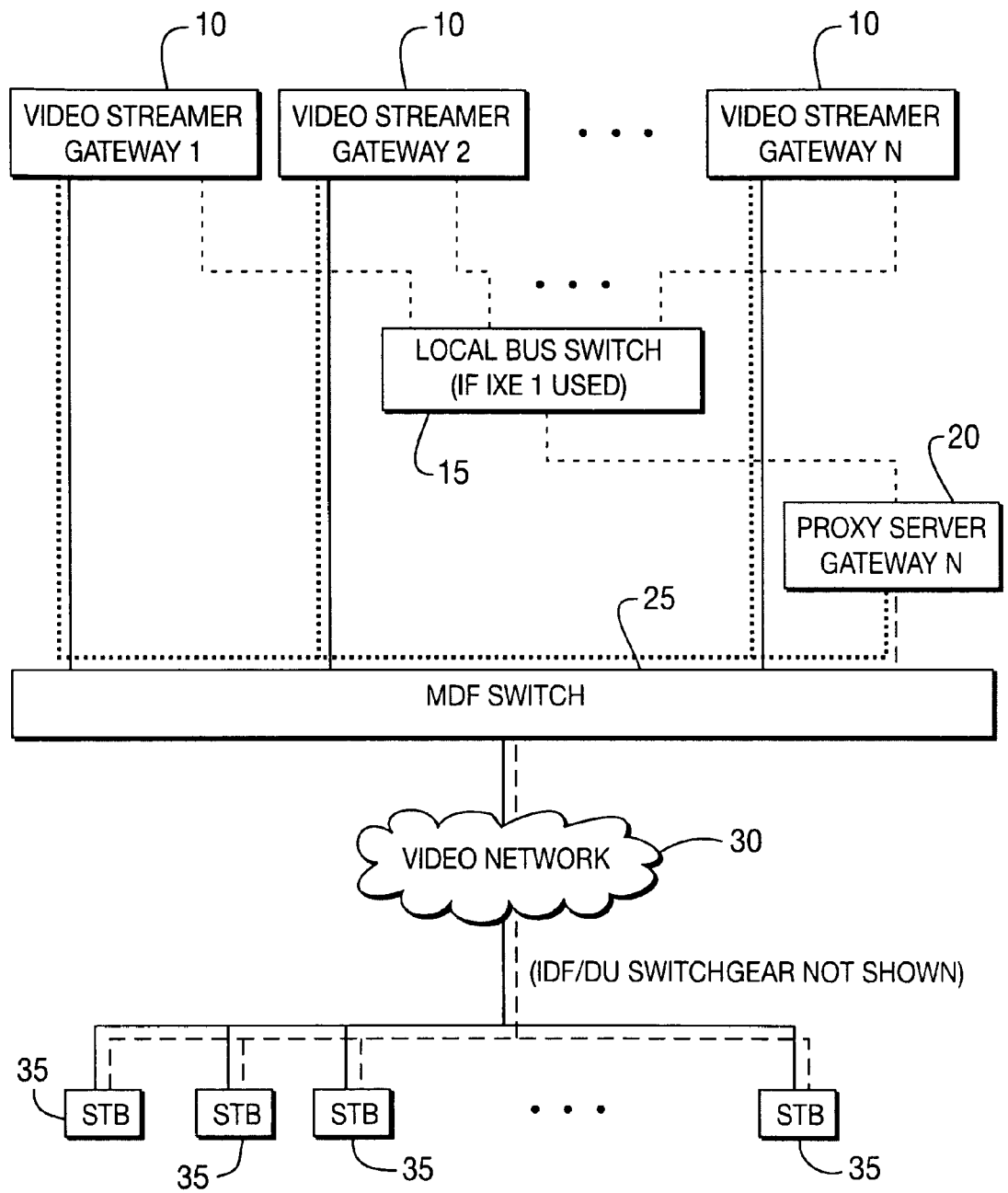
FIG. 1 is a diagram illustrating a system level architecture for performing load balancing according to an exemplary embodiment of the present invention.

Referring now to the drawings, and more particularly to FIG. 1, a diagram illustrating a system level architecture for performing load balancing according to an exemplary embodiment of the present invention is shown. The architecture of FIG. 1 comprises a plurality of streamer gateways (video receiving devices) 10, a local bus switch 15 (which may be optional), a proxy server gateway (a request server) 20, a main distribution frame (MDF) switch 25, a video network 30, and a plurality of client devices embodied as STBs 35. For purposes of example and explanation, the gateways of FIG. 1 are shown and described herein as satellite gateways. However, it will be intuitive to those skilled in the art that the principles of the present invention described herein are not limited to satellite gateways, and may for example be applied to cable gateways, terrestrial gateways, set-top boxes, computers and/or other devices/apparatuses. Likewise, the elements of FIG. 1 may be implemented in any type of suitable network such as, but not limited to, a cable network, an Ethernet switched network, a fiber optic network, and/or other type of network.

The load balancing architecture of FIG. 1 is logically partitioned into a proxy server function and a data (e.g., audio and/or video television channels) streaming function. In FIG. 1, the proxy server function is provided by proxy server gateway 20 and the data streaming function is provided by streamer gateways 10. According to an exemplary embodiment, a streamer gateway 10 may reside in the same gateway as a proxy server gateway 20, although its data load may be restricted in order to minimize its impact on the proxy server function. Alternatively, and as represented in FIG. 1, proxy server gateway 20 can be a stand-alone machine that does not perform the data streaming function. Each streamer gateway 10 is capable of tuning a plurality of television channels and transmitting (i.e., streaming) the content of these channels to multiple client device STBs 35 in a simultaneous manner. For clarity of description, FIG. 1 does not show management (e.g., IXE0—10/100 BaseT Ethernet management interface or 100 BaseT port 0) connectivity. However, it is expected that all gateways 10 and 20 in FIG. 1 have internet access and are remotely configurable via SNMP (Simple Network Management Protocol), telnet, etc.

The load balancing solution provided by the architecture of FIG. 1 supports splitting satellite network feeds across the multiple streamer gateways 10 such that the total data load is distributed across the GEI0 interfaces. System capacity and/or redundancy may be increased by adding additional streamer gateways 10 in accordance with design choice.

Load balancing according to principles of the present invention supports seamless failure reconfiguration and recovery. In the load-balanced system of FIG. 1, streamer gateways 10 are shown for purposes of example as being wired in parallel so that all streamer gateways 10 receive all network feeds. With this arrangement, system reconfiguration does not require a physical cabling change following failure of a streamer gateway 10. Moreover, if a streamer gateway 10 fails, the system can automatically reallocate its current streams to other streamer gateways 10 to minimize service interruption.

Load balancing according to principles of the present invention divorces the RTSP (Real Time Streaming Protocol) proxy server gateway 20 from streamer gateways 10, and divorces the network tuning and data streaming function from proxy server gateway 20. As such, a streamer gateway 10 or a proxy server gateway 20 constructed under the principles of this invention, is less complicated and costs less. For example, a Linux PC can be used as proxy server gateway 20 and a low cost microprocessor can be used in streamer gateways 10, which also include tuners, FPGAs (Field Programmable Gate Arrays), and Giga-bit controllers.

According to an exemplary embodiment, the following considerations may be taken into account when designing the load balancing system:

1. A conventional STB client device may not support RTSP Redirect.
2. Satellite network feeds should be shared across gateways. For example, gateways can be wired in parallel so that all gateway chassis receive all satellite networks.
3. Load balancing can be enabled using a configuration file parameter and takes effect following a reboot.
4. Streamer gateway network, tuner and polarity configurations should be set as configuration file parameters. Network auto-detection/configuration can be added as well.
5. A triplet (network #, transponder frequency, polarization setting) should be unique across streamer gateways.
6. The auxiliary (IXE0) interface may be used for inter-gateway communication.
7. Static tuning should be used to troubleshoot and validate satellite cable feeds and/or tuner operation. System operation may be sub-optimal when static tuning is in use.

Figure 2:
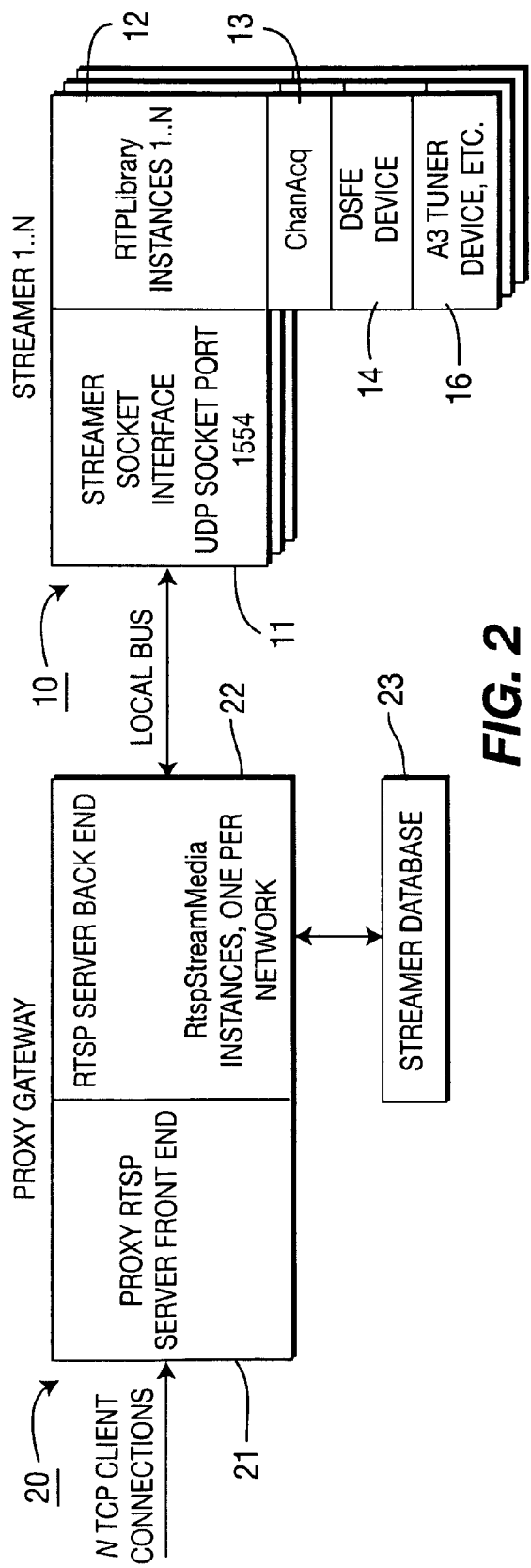
FIG. 2 is a diagram illustrating further details of the proxy server gateway and streamer gateways of FIG. 1 according to an exemplary embodiment of the present invention.

Referring now to FIG. 2, a diagram illustrating further details of proxy server gateway 20 and streamer gateways 10 of FIG. 1 according to an exemplary embodiment of the present invention is shown. As indicated in FIG. 2, proxy server gateway 20 comprises a front end module 21, a back end module 22 and a streamer database 23. Each streamer gateway 10 comprises a socket interface 11, an RTP (Real Time Protocol) library 12, a channel acquisition module 14, a DSFE (digital signaling front end) device module 14 (which operates as a tuner module) and an A3 tuner device module 16.

In FIG. 2, back end module 22 of proxy server gateway 20 communicates with socket interfaces 11 of external streamer gateways 10 over a local bus. According to an exemplary embodiment, the local bus communication can be implemented using a GEI0 interface. An advantage of using the GEI0 interface for local communication is that it may simplify debugging functions, as a single network packet sniffer can be used to capture all client RTSP and inter-gateway message traffic. Other types of interfaces (e.g., USB, etc.) can be used as well.

Proxy server gateway 20 is actually a reverse proxy because it acts as a proxy for all in-bound client RTSP traffic that will in part be forwarded to streamer gateways 10 hidden behind the single proxy server IP address. In contrast, a forward proxy acts as a proxy for out-bound traffic.

Independent of proxy server gateway 20 and streamer gateway 10 functionality, all gateways 10 and 20 may provide:
DHCP (Dynamic Host Configuration Protocol) server
MTFTP (Multicast Trivial File Transfer Protocol) server
Proxy modem server
ICMP (Internet Control Message Protocol) 'Ping' client
A multiple gateway system should allow only one DHCP, MTFTP, or proxy modem server active at one time.

Proxy Server Gateway 20 Functionality

Proxy server gateway 20 should provide the following services:
  Proxy RTSP server, including client status collection and policing.
  SNMP agent MIB (Management Information Base) support. To be precise, the DSFE (digital signaling front end) MIB is associated with the streamer gateway 10 and is handled external to the proxy server gateway 20.
  Network probing to potentially detect theft of service.

Proxy server gateway 20 receives and processes RTSP requests from all client devices (e.g., STBs 35) on the network (see FIG. 1). Requests for existing RTP (Real Time Protocol) sessions are handled directly without intervention from streamer gateways 10. For new sessions, proxy server gateway 20 generates one or more RTP Session messages (see Appendix A) and sends them to a selected streamer gateway 10. Proxy server gateway 20 should preferably maintain a database such as streamer database 23 (see FIG. 2) to track triplet allocation and RTP sessions across streamer gateways 10 in order to balance the load and prevent duplicate triplet settings across streamer gateways 10.

Streamer Gateway 10 Functionality

Streamer gateways 10 provide tuner management and video data pump functionality. Streamer gateways 10 should not provide RTSP server support to client devices (e.g., STBs 35) on the network (see FIG. 1). As such, gateway streamers 10 should not implement RTSP specific derived classes, and should not necessarily use or care about RIDs (Receiver Identifications), RID lists, etc.

Streamer gateways 10 should communicate with proxy server gateway 20 to exchange the following information:
  RTP session control and status
  high-level tuner status
  streamer network configuration and status, via, for example, local bus SAP (Session Announcement Protocol) announcements If proxy server gateway 20 is not enabled on the streamer gateway 10, proxy server-specific MIBs (mxuRtspServerConfig, mxuClientStatus, etc.) should return a "no such instance" message to SNMP queries, where mxuRtspServerConfig and mxuClientStatus represent the configuration of proxy server gateway 20 and the status of its client devices, respectively.

Proxy Server Gateway 20 Functional Partitioning

An RTSP software stack of proxy server gateway 20 includes the following software modules:

| Module/Class | Functionality | Sits on top of/Uses |
|---|---|---|
| RTSP server | Create & maintain client TCP connections & RTSP sessions. Monitor client KeepAlives and gather client status. Pass client requests to correct RtspDsfeMedia instance. Return RTSP status & multicast group IDs to client STBs 35. | RtspDsfeMedia |
| RtspDsfeMedia | Parse client RTSP requests. Pass tune request to correct RTPLibrary instance. | RTPLibrary |
| RTPLibrary | Manage PID grouping and multicast group allocation. Pass tune parameters to DSFE device. | DSFE Device & ChanAcq |
| DSFE Device | Manages the A3 Device | Such as A3 Device |
| A3 Tuner Device | Manages the tuner drivers | Such as Cobra & Corea tuner drivers |

The distribution of the proxy RTSP server functionality preferably should be as shown in FIG. 2. In proxy server gateway 20, modules/classes Streamer and RtspStreamerMedia should be created to model multiple streamer gateways 10 providing an arbitrary set of networks (=media). Each Streamer instance should maintain a list of ProxyRtspDsfeMedia instances, to one per streamer network. In streamer gateways 10, a module is provided to process local bus messages from proxy server gateway 20 and a version (e.g., preferably a stripped down one) of RTP library 12 should pass the tuning and session information to DSFE device module 14 via channel acquisition module 13.

Figure 3:
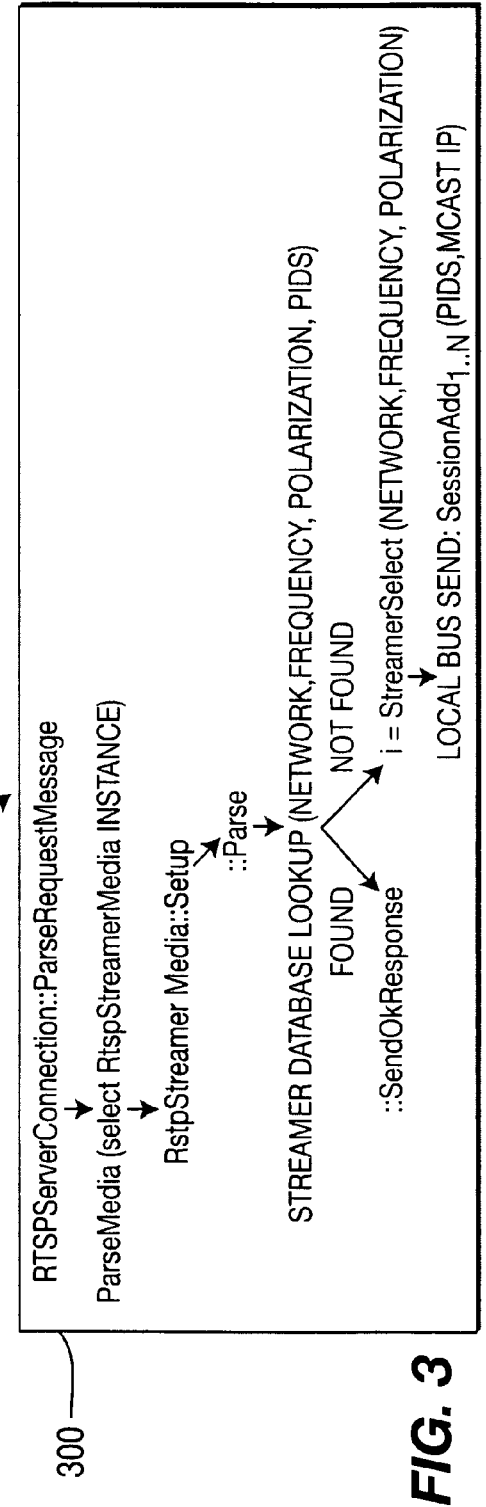
FIG. 3 is a diagram illustrating how the proxy server gateway of FIG. 1 processes a request according to an exemplary embodiment of the present invention.

Referring now to FIG. 3, a diagram illustrating how proxy server gateway 20 of FIG. 1 processes a request according to an exemplary embodiment of the present invention is shown. In FIG. 3, proxy server gateway 20's RtspStreamerMedia module 300 parses client requests and consults streamer database 23 (see FIG. 2) for matching request parameters (network, tuner parameters, and PIDs). If there is a match, proxy server gateway 20 will look up the existing multicast group IP address and return it to the requesting client device 35. Proxy server gateway 20 also increments the database RTP Session user count. If no match exists, the RtspStreamerMedia module 300 selects a streamer gateway 10 and formulates and sends one or more RTP Session commands (see Appendix A.1) over the local bus. Run-time streamer selection attempts to balance the data load across all streamer gateways 10, subject to available resources and is configuration settings. Proxy server gateway 20 allocates multicast IP addresses for new sessions and returns the setup response to the client device 35. During a client RTSP teardown request, the RTP Session user count is decremented. If zero, proxy server gateway 20 sends to SessionDelete message to the appropriate streamer gateway 10.

In a loaded system, there will be a large percentage of streamer database 23 matches (hits) resulting in minimal RTP Session messaging over the local bus. The RTSP server module of proxy server gateway 20 preferably is single threaded and processes one client request at a time from request through response. It blocks until tune/RTP Session requests have been sent to DSFE device module 14 of streamer gateway 10 (see FIG. 2). It should not need or use mutex (mutual exclusion) protection to guard its various management lists and maps. Proxy server gateway 20 generates a client setup response as soon as the RTP session request messages have been sent to streamer gateway 10.

Streamer gateways 10 manage their own tuner pools. Proxy server gateway 20 should not micromanage streamer tuner allocation. Proxy server gateway 20 will periodically query streamer triplet and RTP session status using the status commands detailed in Appendix A.2.

The above partitioning example means that channel acquisition module 13 and DSFE device module 14 runs only on streamer gateways 10, and permits porting the functionality of proxy server gateway 20 to a high performance, low cost platform (e.g., Linux, etc.) that can support more than 1000 users.

Proxy server gateway 20 should monitor the presence and operating states of streamer gateways 10 via periodic streamer SAP announcements sent on the local bus. Proxy server gateway 20 should also detect failed streamer gateways 10 and redistribute the data load across the remaining streamer gateways 10 of the given network.

Operation

Proxy RTSP Server SAP Listener Module

Proxy server gateway 20 will provide a listener module to monitor streamer gateway 10 network SAP announcements. The listener should join a particular multicast group, such as 239.255.255.255 port 19875. Upon reception of a streamer gateway 10's first SAP announcement the listener module should create a new application timer, AppTimer, instance and send a kRtspNewStreamerDetected message to proxy server gateway 20 indicating detection of a new streamer gateway 10. The AppTimer callback function is used to detect streamer SAP announcement failures. The timer is reloaded upon reception of the next streamer SAP announcement. If the timer expires the listener module will send a kRtspStreamerFailed message to proxy server gateway 20 indicating that the streamer gateway 10 has failed and the AppTimer instance should be deleted. The listener module should detect failed streamer gateways 10 that have come back online, and send a kRtspNewStreamerDetected message to proxy server gateway 20.

Proxy RTSP Server Module

The proxy RTSP server module is single threaded. It depends on a select( ) call to service client STB 35, as well as internal and local bus requests. According to an exemplary embodiment, the proxy RTSP server module implements the SAP announcement module, processes client RTSP protocol requests, manages the proxy server database, sends and receives messages from one or more streamer gateways 10, and receives and processes messages from the SAP announcement module.

i. SAP Listener Module Message Handling

Upon reception of a kRtspNewStreamerDetected message proxy server gateway 20 should create a new Streamer class/module instance and add its networks into the applicable RtspStreamerMedia instances. Proxy server gateway 20 should populate the Streamer instance with one ProxyRtspDsfeMedia instance per announced network.

Upon reception of a kRtspStreamerFailed message proxy server gateway 20 should issue an mxuFailDetectGatewayServiceFailure trap and delete the Streamer instance as well its corresponding entries in the RtspStreamerMedia instances.

ii. Aggregate Video Network SAP Announcement

Proxy server gateway 20 should maintain an up-to-date aggregate network SAP announcement and periodically multicast it to the video network. The announcement must be sent to a predefined multicast group such as 239.255.255.255 port 9875.

At boot time, proxy server gateway 20 should delay its aggregate network SAP announcement until mxuBaseStreamerCount (indicating the expected number of streamers in the system) unique SAP announcements have been received, or until a predefined interval, such as two minutes have elapsed, in order to determine which streamer gateways 10 are present and functional. The aggregate announcement should include an entry for network 0xFFFE if local content insertion is enabled in the system.

iii. Streamer Selection Logic

Streamer gateway 10 selection should be fine-grained. Proxy server gateway 20 searches all Streamer instances for an active triplet that matches the requested triplet. If not found, it selects a qualified streamer gateway 10 having the lowest percent loading calculated, for example, as follows:

Streamer gateway 10 percent load=current load/load set point

Using percent load figures, rather than absolute load figures, permits streamer gateways 10 of varying load carrying capabilities to coexist and/or be seamlessly added into the system.

The selection logic creates an ordered list of qualified streamer gateways 10 based on the client request and current percent load statistics. Lightly loaded streamer gateways 10 are preferred over heavily loaded streamer gateways 10. To limit loading on a gateway having both proxy server and streamer functionality, the load set point may be set to a fraction of the maximum load setting. The resulting action is that proxy server gateway 20 should tend to prefer external streamer gateways 10 because they should have a lower percent loading.

Figure 4:
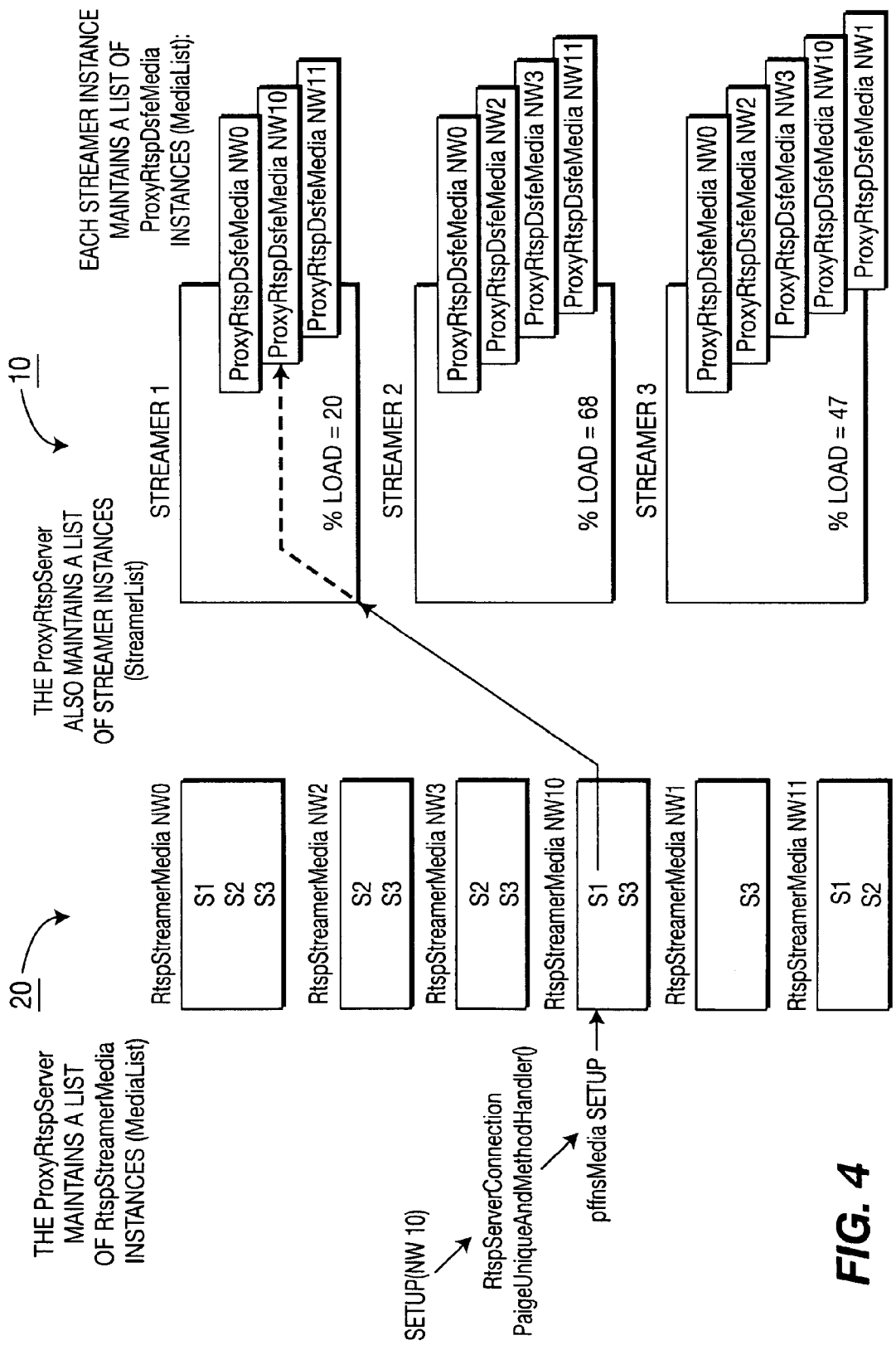
FIG. 4 is a diagram illustrating how the proxy server gateway of FIG. 1 selects a streamer gateway according to an exemplary embodiment of the present invention.

Referring now to FIG. 4, a diagram illustrating further details regarding how proxy server gateway 20 of FIG. 1 selects a streamer gateway 10 according to an exemplary embodiment of the present invention is shown. In particular, using a C++ class as an example, FIG. 4 illustrates streamer gateway 10 selection and how a client RTSP Setup request is processed in a multiple streamer gateway 10 system. The selection logic pseudo code is as follows:

StreamerSelect:

```
//look for existing triplet match
for all ProxyRtspDsfeMedia instances across all streamers:
    for all media that match the requested network and polarization
        if existing slot contains triplet match
            return streamer ID
    end
end
//existing triplet not active, need to pick a streamer.
//created list of qualified streamers:
for all ProxyRtspDsfeMedia instances across all streamers:
    for all media that match the requested network and polarization
        if streamer load exceeds a predetermined maximum bandwidth limit
            do not include streamer in list
        if media previously marked as Failed
            order the streamer based on its failure timestamp (oldest failure first)
        else
            add small dither to current loading statistic
            order the streamer based on its current percent loading statistic
                (lowest loading first)
    end
end
return first streamer ID in list
``` iv. Maximum Client Restriction

Proxy server gateway 20 should enforce a maximum number of client devices (e.g., STBs 35) based on metrics such as TCP connection count. The preferred default maximum is 500 client device connections. New TCP connection requests may be silently refused when the maximum count is reached. The client device count may be overridden with a setting extracted from a valid SW License Key.

Proxy server gateway 20 should send a SNMP trap if the maximum number of connections is active and a new connection request is received. A trap should be sent the first time this occurs and every predetermined number of occurrences thereafter. Proxy server gateway 20 could enforce a maximum number of clients based on RID. Proxy server gateway 20 could for example send a 503: ServiceUnavailable response if the maximum number of RTSP client devices is being served and a RTSP Setup request from a new RID is received.

Inter-Gateway Communication

Local bus communication between proxy server gateway 20 and streamer gateways 10 should be over UDP (see FIG. 2). Message types and formats is are listed in Appendix A and should contain ASCII-readable fields consisting of a command string followed by one or more parameter-request or parameter-set fields. Parameter fields are delimited by <CR><LF>. Each message should contain a command sequence number (CSeq) and content length (Content-length) field.

Proxy server gateway 20 should initiate all communication with streamer gateways 10. Illustratively, proxy server gateway 20 is a client (master) and streamer gateway 10 is a server (slave). Streamer gateway 10 server socket should be bound to a particular UDP port such as port 1554 (see FIG. 2). Proxy server gateway 20 should create a single UDP socket at a particular port such as 1555 to communicate with all streamer gateways 10.

Proxy server gateway 20 should monitor message delivery success using a send and receive counter. The send counter should be incremented when proxy server gateway 20 sends a message to a streamer gateway 10. The receive counter should be incremented when proxy server gateway 20 receives an acknowledgement from the streamer gateway 10. Each message should have a unique send sequence number that is returned in the acknowledgement. TCP messaging may be used as well especially if data from a loaded system shows an unacceptable amount of message loss. Refer to Appendix A for the detailed format of each message.

v. RTP Session Messages

Proxy server gateway 20 sends 3 types of RTP Session messages to streamer gateways 10:

| Proxy Server → Streamer Messages | Usage |
| --- | --- |
| SessionAdd request | Start stream |
| SessionUpdate request | Update stream |
| SessionDelete request | Stop stream |

| Streamer → Proxy Server Messages | Usage |
| --- | --- |
| Session request acknowledgment | Track message success | vi. Status Request Message

Proxy server gateway 20 sends 2 types of status request messages to streamer gateways 10:

| Proxy Server → Streamer Messages | Usage |
| --- | --- |
| Streamer Status request | Request streamer loading statistics and triplet status |
| Session Status request | Request RTP session status for triplet |

| Streamer → Proxy Server Messages | Usage |
| --- | --- |
| Streamer Status request response | Update proxy server streamer database |
| Session Status request response | Update proxy server streamer database |

The Status Request polling interval will be 2 seconds. It will not be MIB-settable.

Streamer Gateway 10 Status Reporting

Streamer gateways 10 should maintain a list of active triplets and return this information in the Status Request response message. Allocated triplets are reported as either good (St: D1) or failed (St: D0). When a tuner loses lock or cannot be tuned, a streamer gateway 10 should automatically try to use another free tuner to fulfill the tune request. If the streamer gateway 10 tries all available tuners and fails, the Status Request entry for this triplet will indicate failure (St: D0).

Proxy server gateway 20 should use the triplet status to look up the corresponding DsfeSetting slot(s) representing a tuner in its database. If a triplet status indicates failure, proxy server gateway 20 should update its database and mark the slot as failed. The slot failure time should be set to the current time. Proxy server gateway 20 should tear down all RTP sessions associated with the failed triplet and reset the client RTSP cookies. These cookies relate client RTSP sessions to the underlying RTP sessions that carry the requested programs.

vii. Proxy Server Error Handling

Each slot resource should maintain a watchdog counter. The counter is reset to a predefined number, such as 3, when the corresponding triplet status is received from a streamer gateway 10. If the streamer gateway 10 does not acknowledge a triplet previously added by the proxy server gateway 20, the counter is decremented. When it reaches zero, the slot has timed out and the following action should be taken:

If a dynamic slot (i.e., the associated tuner is dynamically tuned), proxy server gateway 20 should send a Session-Update message to the streamer gateway 10 indicating a session update for all associated RTP sessions.

If a static slot (associated tuner is statically tuned), proxy server gateway 20 should internally delete all RTP sessions for this triplet and delete the slot.

If proxy server gateway 20 receives a triplet status message containing an unknown triplet, proxy server gateway 20 should send a SessionDelete message indicating that the session will be deleted to the streamer gateway 10 containing the unknown triplet along with a predefined destination IP address, such as 255.255.255.255. The streamer gateway 10 should tear down all RTP sessions associated with this triplet and free the tuner resource.

Static Tuning Support

Static tuning is a troubleshooting mode used to validate satellite cable feeds and/or tuner operation. Except for slot type (static/dynamic) and triplet status, proxy server gateway 20 should not manage or track streamer gateway 10 tuner allocation, either static or dynamic.

Static tuners are indicated in the streamer gateway 10 status response messages (St: S1 to St: S32). If the streamer gateway 10 cannot move the existing (dynamic) RTP sessions to a free tuner, the streamer gateway 10 will indicate a dynamic tuner failure (St: D0) for the existing triplet and proxy server gateway 20 should send a teardown to the streamer gateway 10. Video glitches seen on RTP sessions associated with static tuning changes should be acceptable.

Streamer Gateway 10 SAP Announcer

Streamer gateway 10 network announcements should be sent to predefined local bus multicast group, such as 239.255.255.255 port 19875. The following streamer gateway 10 SAP announcement features may be needed to support load balancing.

SDP Session Bandwidth

Streamer announcements should provide the following new SDP session bandwidth attributes:

| Session Bandwidth consisting of Load Set point and Max Load, both in MBPS | b=X-load:<LoadSetpoint>/<MaxLoad> | <set point> (MBPS) is the set point used to restrict streamer video loading relative to its MaxLoad value <MaxLoad> (MBPS) is the maximum usable MBPS of the streamer video interface |
|---|---|---|

The set point and maximum load information is set by MIB elements mxuStreamerConfigMaxLoad and mxuStreamerConfigLoadSetpoint.

SDP Session Connection Information

Since streamer media connection information (c) is actually set on a to per-streamer basis and not on a per-network basis, the network SAP announcement SDP media attribute connection information (c) should be a single SDP session attribute. The multicast start and range information is by MIB elements mxuIpServicesAddrMcastStart and mxuIpServicesAddrMcastEnd.

SDP Media Information X-dsfe-count

Announcements should indicate supported networks and number of tuners for a given polarization setting. The network SAP announcement SDP media attribute X-dsfe-count should be as follows:

| DSFE Count Attribute | a=X-dsfe-count:<pType1Count>/<pType2Count> | <pType1Count> is the number of DSFEs (tuner/demodulators) available for this media title on Left/Horizontal polarization <pType2Count> is the number of DSFEs (tuner/demodulators) available for this media title on Right/Vertical polarization |
|---|---|---|

Representative Streamer SAP Announcements

EXAMPLE 1

A streamer gateway 10 is configured for (NW 0 L, NW 15 L+R, and NW 1H) as follows:
NW 0 L: tuners 1-12
NW 15 L: tuners 1-12. Divide tuner count by 2 (don't count legacy tuner)
NW 15 R: tuners 13-24. Divide tuner count by 2 (don't count legacy tuner)
NW 1H: tuners 24-32.
The corresponding SAP announcement is as follows:
Session Announcement Protocol
Originating Source: 10.0.30.7
Payload type: application/sdp
Session Description Protocol
Session Description Protocol Version (v): 0
Owner/Creator, Session Id (o): -0 1 IN IP4 10.0.30.7
Session Name (s): SERVICEPROVIDERNAME
Session Information (i): SERVICEPROVIDERNAME content
Connection Information (c): IN IP4 239.255.0.0/128/2048
Bandwidth Information (b): X-load: 100/800
Media Description, name and address (m): data 1024 RTP/AVP 96
Media Title (i): network0
Media Attribute (a): control:rtsp://10.0.30.7/SERVICEPROVIDERNAME/network0
Media Attribute (a): X-dsfe-count:12/0
Media Description, name and address (m): data 1024 RTP/AVP 33
Media Title (i): network15
Media Attribute (a): control:rtsp://10.0.30.7/SERVICEPROVIDERNAME/network15
Media Attribute (a): X-dsfe-count:6/6
Media Description, name and address (m): data 1024 RTP/AVP 96
Media Title (i): network1
Media Attribute (a): control:rtsp://10.0.30.7/SERVICEPROVIDERNAME/network1
Media Attribute (a): X-dsfe-count:8/0

EXAMPLE 2

An LCI streamer gateway 10 capable of 10 GBPS (8000 MBPS usable) is located at IP address 10.0.30.3 is configured for network FFFE (=65534 decimal) as follows:
NW FFFE: 4 local channels are available, plus a program guide channel. The streamer gateway 10 uses base multicast IP address 239.255.100.0.
The corresponding SAP announcement is as follows:
Session Announcement Protocol
Originating Source: 10.0.30.3
Payload type: application/sdp
Session Description Protocol
Session Description Protocol Version (v): 0
Owner/Creator, Session Id (o): -0 1 IN IP4 10.0.30.3
Session Name (s): SERVICEPROVIDERNAME
Session Information (i): LOCAL content
Connection Information (c): IN IP4 239.255.100.0/128/5
Bandwidth Information (b): X-load:8000/8000
Media Description, name and address (m): data 1024 RTP/AVP 33
Media Title (i): network65534
Media Attribute (a): control:rtsp://10.0.30.3/SERVICEPROVIDERNAME/network65534

Media Attribute (a): X-dsfe-count:5/0

Dynamic Announcements

Streamer gateways 10 could periodically update their SAP announcement content to incorporate failed tuner information or changes in the bandwidth set point. Proxy server gateway 20 would update its database accordingly.

Gateway Reboot Scenarios

Gateway reboots fall into three categories:

all gateways 10 and 20 reboot one or more streamer gateways 10 reboot just proxy server gateway 20 reboots The latter two cases are of interest as follows:

Streamer-Only Reboot

Proxy server gateway 20 should use the kRtspStreamerFailed and kRtspNewStreamerDetected messages to indicate streamer gateway 10 failure and/or reboot. Failed streamer gateways 10 should be removed from the streamer database and the data load redistributed across remaining streamer gateways 10. Likewise, newly operational streamers should be seamlessly added to the database and over time the video load is redistributed across the streamer gateway 10 population.

Proxy Server-Only Reboot

It is a design goal to minimize video disruption due to a proxy server gateway 20 reboot. The proxy server gateway 20 boot sequence is as follows:

1. detect streamer SAP announcements
2. for each streamer gateway 10 detected:
    2:1 send SESSIONDELETE(All) request to teardown all existing streamer sessions Following boot up, proxy server gateway 20 should request streamer triplet and RTP session status from all known streamer gateways 10. It must reconstruct its database prior to processing any client RTSP requests.

The proxy server boot sequence can be as follows:

1. detect streamer gateway 10 SAP announcements
2. for each streamer gateway 10 detected:
    2.1 send STREAMERSTATUS request to learn what triplets are active
        2.1.1 for each active triplet, send SESSIONSTATUS request to learn what RTP sessions are active
3. enable proxy server front end (service client requests)

Local Content Insertion

The LCI (local content insertion) streamer gateway(s) 10 should be one or more standalone PCs and/or dumb IP cameras. Client setup requests for any network that contains a reserved PID (0xFF0-0xFFF) bypass the normal RTSP proxy server/streamer operation. Proxy server gateway 20 should determine the multicast group offset based on the requested PID and transponder number. Each streamer gateway 10 (one PID reserved for each) could support up to 16 channels (multicast groups), one per transponder frequency setting.

Dumb IP Camera

Proxy server gateway 20 should provide a separate application module, if enabled, to generate and stream the local content program guide. This application should also generate a network FFFE SAP announcement on the local bus to indicate the local content base multicast IP address. The SAP announcement connection information indicates the local content base multicast IP address for all streamer gateways 10. It could also indicate the number of available local channels.

PC streamer gateway 10

PC streamer gateways 10 will generate their own streamer SAP announcements for network FFFE. They will also generate a minimal program guide on one or more multicast groups within the streamer multicast range.

Exemplary Classes (Proxy Server Gateway 20)

RtspStreamerMedia Class

One instance is created per network.

Private Data:
    network path (session name & media title)
    list of streamer gateway instances that support this network
    map of media cookies in use with this network
    others Streamer Gateway 10 Class One instance is created per streamer gateway 10.

Private Data:
    streamer gateway 10 IP address and server port
    bandwidth settings and current loading statistic
    streamer gateway 10 keepalive timer
    multicast address factory instance ptr
    list of ProxyRtspDsfeMedia instances, one per streamer network
    file descriptor of streamer UDP socket, bound to port 1554
    others ProxyRtspDsfeMedia Class One instance is created per streamer gateway 10 per network.

Private Data:
    Media title & network number
    RTSP statistics (num setups, parse errors, etc)
    proxyRtpLibrary instance ptr for this media instance
    others TripletMediaCookie Class One instance is created per client RTSP session and stored in the RtspServerConnection instance.

Private Data:
    Streamer instance ptr
    Triplet
    PidList

Slot Class

One instance is created per streamer gateway 10 triplet.

Private Data:
    DSFE Settings for this slot
    Triplet
    Slot watchdog counter
    TripletRtpSession list
    Slot type (static/dynamic)
    others TripletRtpSession Class One instance is created per streamer RTP session and is stored in a streamer Slot list.

Private Data:
    ptr to associated Slot's DSFE Settings
    Triplet
    PidList
    Multicast destination address & port
    others AppTimer Class One instance is created per streamer gateway 10.

Private Data:
    O/S timer instance
    timer reload value

SAPAnnouncement Class

One instance is created per detected streamer gateway 10.

Private Data:
    data buffer, holds most recent SAP announcement from streamer gateway 10

Exemplary Modules

1. Proxy Server Gateway 20

SAP Listener Module:

Proxy server gateway 20 must implement a SAP listener module. This module sends the following new message types to the proxy RTSP server module:
  Streamer gateway 10 SAP announcement received
  Streamer gateway 10 SAP announcement timeout Proxy RTSP Server Module:

As described earlier the proxy RTSP server module must use the new Streamer, RtspStreamerMedia, and ProxyRtsp-DsfeMedia classes instead of the 1.x RtspDsfeMedia class.
  must provide support for SAP listener module messages
  must generates an aggregate network SAP announcement
  must implement messaging functions to send/receive streamer gateway 10 messages
  others When streamer gateway 10 and proxy server gateway 10 reside within the same gateway chassis, the proxy server gateway 20 initialization code is independent of the streamer gateway 10 initialization code.

The proxy server module should return RTSP statistics and issue RTSP SetupParseError (indicating parsing errors) and ServerTerminatedSession (indicating session termination) traps. DsfeAllocationError and McastAllocationError traps should be handled by the streamer gateway 10's RTP library 12 (see FIG. 2).

2. Streamer Gateway 10

Each streamer gateway 10 implements a module to monitor the local bus socket. This module generally emulates the RTSP stack as follows:
  for each network present, creates a RtspDsfeMedia and RTPLibrary instance
  based on RtspSession and RtspDsfeMedia configuration file settings, generates a network SAP announcement on the local bus
  creates local bus UDP socket, for example, port 1554
  implements messaging functions to send/receive proxy server gateway 20 messages
  fields proxy server RTP session requests
  manages tuners and FPGAs/data pump functionality The RTP library interface module must be enhanced to return a triplet status code for use in responding to proxy server streamer status request messages. The streamer server initialization code should independent of the proxy RTSP server initialization code.

Exemplary Configuration Parameters

The following configuration file/SNMP MIB parameters are checked at boot time to configure the gateways.

| Parameter Name | Param Type | Usage | Example | Default Setting |
|---|---|---|---|---|
| mxuRtspServerConfigProxyEnable | integer | enable proxy server 20 | true | false |
| mxuRtspServerConfigStreamerCount | integer | expected # of streamers 10 | 4 | 0 |
| mxuRtspServerConfigMaxClients | integer | (read-only) number of authorized RTSP clients 35 | 1500 | 500 |
| mxuIpServicesTftpsMcastStart | IP address | MTFTP server pool starting IP address | 239.255.100.0 | none |
| mxuIpServicesTftpsMcastEnd | IP address | MTFTP server pool ending IP address | 239.255.100.15 | none |
| mxuStreamerConfigStreamerEnable | integer | enable streamer | true | true |
| mxuStreamerConfigMaxLoad | integer | Maximum usable MBPS of streamer video interface | For a V2 streamer, 800 MBPS | 800 |
| mxuStreamerConfigLoadSetpoint | integer | Set point used to restrict streamer video loading relative to its MaxLoad value | 100 MBPS | 800 |

If mxuRtspServerConfigProxyEnable is true, the proxy RTSP server module is started. If false, configuration settings are ignored and also treated as false:
  mxuNetworkAuditAdminEnabled mxuRtspServerConfigStreamerCount is used by proxy server gateway 20 at boot time to indicate the expected number of streamer gateways 10 in the system. Proxy server gateway 20 will delay its aggregate network SAP announcement until it has received mxuRtspServerConfigStreamerCount unique SAP announcements, or, until a predefined interval, such as two minutes, have expired.

If mxuStreamerConfigStreamerEnable is true, the streamer gateway 10 SAP announcer is enabled. If false, the streamer gateway 10 SAP announcement is disabled, and the proxy server gateway 20 should not send new RTP session requests to that streamer gateway 10.

Exemplary APIs

These APIs are globally Accessible APIs.
bool isProxyServer(void)
  This function returns the boot state of configuration file parameter mxuRtspServerConfigProxyEnable.
bool isStreamer(void)
  This function returns true if at boot time there are one or more active mxuRtspDsfeMediaConfigRowStatus configuration file entries. Additionally, at least one active mxuRtspSessionConfigRowStatus entry must exist.
  Example usage: The SNMP agent will use this API to regulate MIB access to the RTSP server MIBs.
bool isActiveStreamer(void)

This function returns true if both mxuStreamerConfig-StreamerEnable and is Streamer( ) is true.

Example usage: Streamer gateway 10 will use this API to regulate SAP announcements.

According to the principles of the invention, proxy server gateway 20 should be able to support over 2000 client devices (e.g., STBs 35). The STB client request module should expose a UDP socket at a predefined port, such as port 554, to support UDP-based STB clients.

Figure 5:
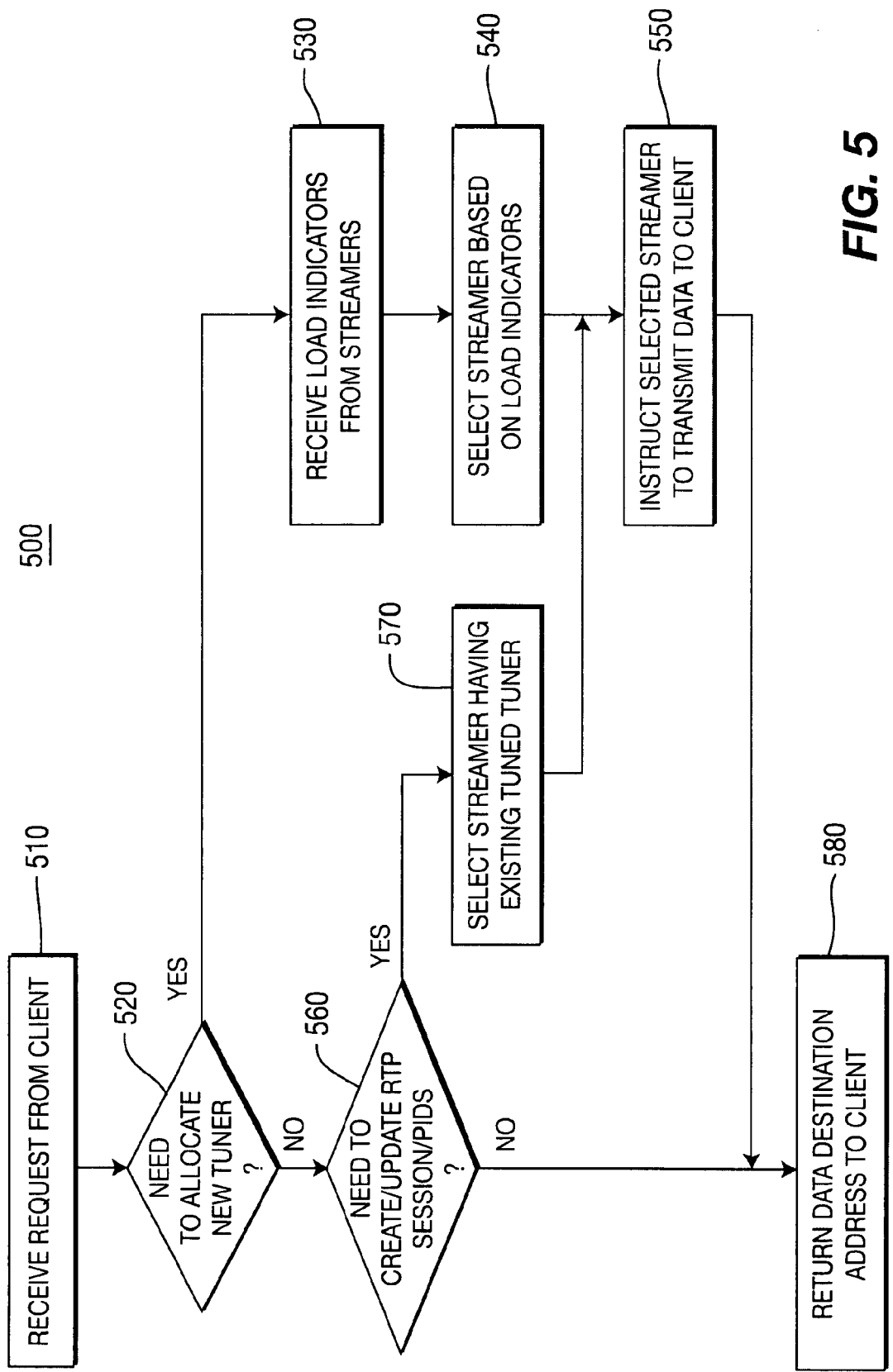
FIG. 5 is a flowchart illustrating steps for operating the proxy server gateway of FIG. 1 according to an exemplary embodiment of the present invention.

Referring now to FIG. 5, a flowchart 500 illustrating steps for operating proxy server gateway 20 of FIG. 1 according to an exemplary embodiment of the present invention is shown. The steps of FIG. 5 are only exemplary, and are not intended to limit the present invention in any manner.

At step 510, proxy server gateway 20 receives a request signal from a client device STB 35. According to an exemplary embodiment, the request signal indicates a request that a particular program be downloaded (i.e., streamed) to the requesting client device STB 35.

At step 520, proxy server gateway 20 determines whether it needs to allocate a new tuner from streamer gateways 10 to accommodate the request received at step 510. For example, if one of the streamer gateways 10 is already tuning a signal source (e.g., transponder) that carries the requested program, a new tuner is not required. Alternatively, if one of the streamer gateways 10 is not already tuning a signal source that carries the requested program, a new tuner is required.

If the determination at step 520 is positive, process flow advances to step 530 where proxy server gateway 20 receives receiving respective load indicators from streamer gateways 10. According to an exemplary embodiment, the respective load indicators indicate respective percentages of load set points for streamer gateways 10. Step 530 is performed periodically so that proxy server gateway 20 can keep apprised of the current load indicators associated with each of the streamer gateways 10.

At step 540, proxy server gateway 20 selects one of the streamer gateways 10 according to the load indicators. According to an exemplary embodiment, proxy server gateway 20 selects at step 540 the streamer gateway 10 that has the lightest load according to the respective load indicators received at step 530.

At step 550, proxy server gateway 20 instructs the particular streamer gateway 10 selected at step 540 to transmit the program requested at step 510 to the requesting client device STB 35 at a particular destination address. From step 550, process flow advances to step 580 where proxy server gateway 20 returns the destination address to the requesting client device STB 35 so that it can receive the requested program which is being transmitted by the selected streamer gateway 10. According to an exemplary embodiment, the requesting client device STB 35 may already know the destination address prior to the execution of step 580. In this manner, step 580 may be performed to simply confirm the destination address to the requesting client device STB 35.

Referring back to step 520, if the determination at that step is negative (e.g., no need to allocate a new tuner), process flow advances to step 560 where proxy server gateway 20 determines if it needs to create or update an RTP session or program identifiers (PIDs). If the determination at step 560 is negative, this indicates that the program requested at step 510 is already being provided by one of the streamer gateways 10. Accordingly, in this case, process flow advances to step 580 where proxy server gateway 20 simply provides the applicable destination address to the requesting client device STB 35 so that it can receive the requested program which is already being transmitted by one of the streamer gateways 10.

Alternatively, if the determination at step 560 is positive, process flow advances to step 570 where proxy server gateway 20 selects the particular streamer gateway 10 having the existing tuned tuner (i.e., the streamer gateway 10 that is already tuning a signal source (e.g., transponder) that carries the requested program). From step 570, process flow advances to step 550 as previously described herein.

Figure 6:
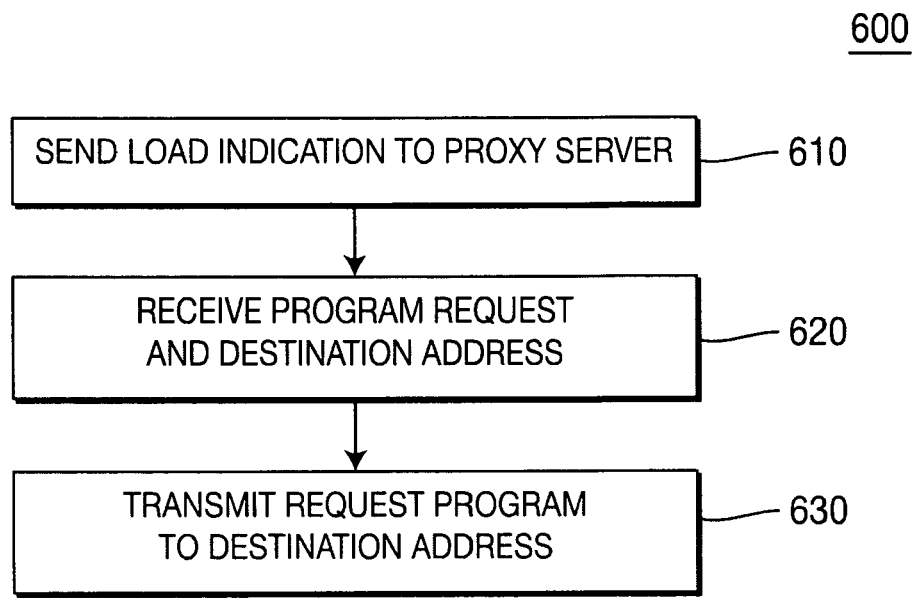
FIG. 6 is a flowchart illustrating steps for operating one of the streamer gateways of FIG. 1 according to an exemplary embodiment of the present invention.

Referring now to FIG. 6, a flowchart 600 illustrating steps for operating one of the streamer gateways 10 of FIG. 1 according to an exemplary embodiment of the present invention is shown. The steps of FIG. 6 are only exemplary, and are not intended to limit the present invention in any manner.

At step 610, streamer gateway 10 sends its load indication to proxy server gateway 20. According to an exemplary embodiment, each streamer gateway 10 performs step 610 on a periodic basis so that proxy server gateway 20 can keep apprised of the current load indicators associated with streamer gateways 10. As indicated above, the load indicator sent at step 610 indicates a percentage load associated with the particular streamer gateway 10.

At step 620, streamer gateway 10 receives a program request and a is destination address. According to an exemplary embodiment, streamer gateway 10 receives from proxy server device 20, data indicating a requested program and a destination address of a client device STB 35 associated with the requested program. Also according to an exemplary embodiment, step 620 is performed in response to proxy server device 20 determining that the streamer gateway 10 receiving the program request and destination address has a lowest load among the plurality of streamer gateways 10.

At step 630, streamer gateway 10 transmits the requested channel to the destination address. According to an exemplary embodiment, streamer gateway 10 transmits the requested program to the destination address of the requesting client device STB 35 and thereby enables a user at the client device STB 35 to listen to and/or view the requested program.

Figure 7:
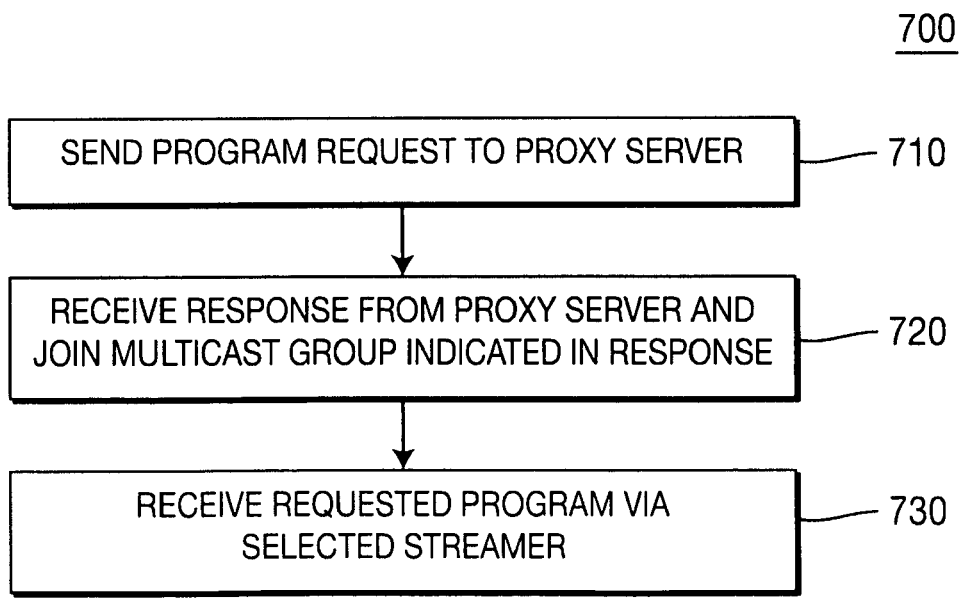
FIG. 7 is a flowchart illustrating steps for operating one of the STBs of FIG. 1 according to an exemplary embodiment of the present invention.

Referring now to FIG. 7, a flowchart 700 illustrating steps for operating one of the STBs 35 of FIG. 1 according to an exemplary embodiment of the present invention is shown. The steps of FIG. 7 are only exemplary, and are not intended to limit the present invention in any manner.

At step 710, STB 35 sends a request signal to proxy server gateway 20. According to an exemplary embodiment, the request signal indicates a request that a particular requested program be downloaded to the requesting client device STB 35.

At step 720, STB 35 receives a response message from proxy server gateway 20 and joins a multicast group indicated in the response message. That is, assuming that the requested program is already available on the network from one of the streamer gateways 10, the response message from to proxy server gateway 20 may include a multicast network address which can be used by the STB 35 to access the requested program.

At step 730, STB 35 receives the requested program via a streamer gateway 10 selected by proxy server gateway 20 using the multicast network address. According to an exemplary embodiment, the client device STB 35 receives the requested program via a streamer gateway 10 which has been selected by proxy server gateway 20 from among the plurality of streamer gateways 10 based on their respective load indicators. STB 35 then decodes and outputs the received program.

According to another exemplary embodiment, if one of the streamer gateways 10 is sending requested video data from a video source (e.g., television channel) using a unicast, proxy server gateway 20 may send a signal requesting the sending streamer gateway 10 to convert the unicast into a multicast, and may also send a multicast network address to a client device STB 35 requesting the video source so that the client device STB 35 can receive the video data from the video source using the multicast network address.

The principles of FIGS. 5-7 described above may be implemented independently, or may be used in conjunction with one another in any suitable manner.

Appendix A. Proxy Server→Streamer Message Formats

A.1 RTP Session Messages

Session Messages consist of the following format. Each line ends with a <CR><LF>.
Command request/response identifier line
Header parameters, one per line
<CR><LF> separator to denote end of header
Payload parameters, one per line
<CR><LF> separator to denote end of payload A.1.1 SessionAdd Request Message The request must include all fields. Order is not important. All fields are ASCII text.
SESSIONADD/Request

| | |
|---|---|
| CSeq: | int |
| Content-length: | int |
| MediaPath: | RtspSessionName/network### |
| Triplet: | 32 bit hex number: 0xzzzzzzzz |
| Frequency: | 32 bit unsigned int |
| Polarization: | lhcp, rhcp, horizontal, vertical |
| Standard: | dss, dvbs, dvbs2, amc |
| Modulation: | qpsk, 8psk |
| Symbol-Rate: | 32 bit unsigned int |
| Code-Rate: | 2-3, 6-7, etc. |
| Alpha: | int (0, 1, or 2) |
| Pilot: | true, false |
| Gold-Code: | int |
| Amc-Mode: | int |
| PLS: | 12 hex digits 010203040506070809101112 |
| Xport-Packets: | int |
| Low-Jitter: | true, false |
| Pids: | int, int, int, ... |
| Destination-Address: | xx.xx.xx.xx |
| Destination-Port: | int |

A.1.2 SessionAdd Response Message

The response must include all fields except for StatusReason, which is optional.
SESSIONADD/Response

| | |
|---|---|
| CSeq: | int |
| Content-length: | int |
| Triplet: | 32 bit hex: 0xzzzzzzzz |
| Status: | int (0 = success) |
| StatusReason: | ASCII string |
| Errors: | 100 = Message Parse Error |
| | 101 = Missing Essential Parameter |
| | 102 = Media Unavailable |
| | 103 = Session Allocation Failed |

A.1.3 SessionUpdate Request Message

The request should include triplet and destination address, and other dsfe/session fields that are to be updated. Order is not important.

SESSIONUPDATE/Request

| | |
|---|---|
| CSeq: | int |
| Content-length: | int |
| MediaPath: | RtspSessionName/network### |
| Triplet: | 32 bit hex: 0xzzzzzzzz |
| Frequency: | 32 bit unsigned int |
| Polarization: | lhcp, rhcp, horizontal, vertical |
| Standard: | dss, dvbs, dvbs2, amc |
| Modulation: | qpsk, 8psk |
| Symbol-Rate: | 32 bit unsigned int |
| Code-Rate: | 2-3, 6-7, etc. |
| Alpha: | int (0, 1, or 2) |
| Pilot: | true, false |
| Gold-Code: | int |
| Amc-Mode: | int |
| PLS: | 12 hex digits 010203040506070809101112 |
| Xport-Packets: | int |
| Low-Jitter: | true, false |
| Pids: | int, int, int, ... |
| Destination-Address: | xx.xx.xx.xx |
| Destination-Port: | int |

A.1.4 SessionUpdate Response Message

The response must include all fields except for StatusReason, which is optional.
SESSIONUPDATE/Response

| | |
|---|---|
| CSeq: | int |
| Content-length: | int |
| Triplet: | 32 bit hex: 0xzzzzzzzz |
| Status: | int (0 = success) |
| StatusReason: | ASCII string |
| Errors: | 100 = Message Parse Error |
| | 101 = Missing Essential Parameter |
| | 102 = Media Unavailable |
| | 103 = Session Allocation Failed |
| | 104 = Session Not Found |

A.1.5 SessionDelete Request Message

The request identifies the triplet and destination address.
If the destination address is 255.255.255.255, the streamer gateway 10 must delete all RTP sessions associated with the requested triplet and free the tuner resource.
If the triplet value is 0xFFFFFFFF and the destination address is 255.255.255.255, the streamer gateway 10 must delete all RTP sessions and free all triplets (tuner resources) on this streamer gateway 10.
SESSIONDELETE/Request

| | |
|---|---|
| CSeq: | int |
| Content-length: | int |
| Triplet: | 32 bit hex: 0xzzzzzzzz |
| Destination-Address: | xx.xx.xx.xx |

A.1.6 SessionDelete Response Message

The response must include all fields except for StatusReason, which is optional.
SESSIONDELETE/Response

| | |
|---|---|
| CSeq: | int |
| Content-length: | int |
| Triplet: | 32 bit hex: 0xzzzzzzzz |
| Status: | int (0 = success) |
| StatusReason: | ASCII string |
| Errors: | 100 = Message Parse Error |
| | 101 = Missing Essential Parameter |
| | 102 = Media Unavailable |
| | 104 = Session Not Found |

A.2 Status Messages

Status Messages consist of the following format. Each line ends with a <CR><LF>.
Command request/response identifier line
Header parameters, one per line
<CR><LF> separator to denote end of header
Payload parameters, one per line
<CR><LF> separator to denote end of payload A.2.1 Streamer Status Request Message The request identifies the fields of interest.
STREAMERSTATUS/Request

| | |
|---|---|
| CSeq: | int |
| Content-length: | int |
| LoadStat: | int |
| NumTriplets: | int |
| Nw: | int |
| Po: | int |
| Fr: | int |
| St: | int (D0, D1)-- |

A.2.2 Streamer Status Response Message

The streamer gateway 10 will generate a response message that contains the requested loading statistic followed by an array of triplet status entries. The number of entries returned is specified by NumTriplets.

| Triplet Field Mnemonic | Indicates | Max Characters/Digits |
|---|---|---|
| Nw | network | 2 |
| Po | polarization | 2 |
| Fr | frequency (MHz) | 4 |
| St | status | 3 |

The triplet status (St) field is up to 3 characters as follows: first character indicates Static or Dynamic tuning
second/third characters indicates success (1 to 32) or failure (0 (zero))

The streamer gateway 10 will never report a failed static tuner (St: S0). It will also keep trying to tune a static tuner. More than one tuner can be statically assigned to the same triplet setting. In this case the status field indicates how many tuners are using the triplet setting. When dynamic tuning, the status field must indicate either 1 (good) or 0 (failed) tuners.

An example status request response, assuming the streamer has 3 active triplets where one of them is statically tuned:
STREAMERSTATUS/Response

| | |
|---|---|
| CSeq: | int |
| Content-length: | int |
| LoadStat: | 283 |
| NumTriplets: | 3 |
| Nw: | 0 |
| Po: | 2 |
| Fr: | 988 |
| St: | D1 |
| Nw: | 0 |
| Po: | 3 |
| Fr: | 974 |
| St: | D1 |
| Nw: | 0 |
| Po: | 2 |
| Fr: | 1267 |
| St: | S5 |

The largest message response occurs when the streamer reports status on 32 unique triplets.

A.2.3 Session Status Request Message

The message must include media path value, triplet value and at least one additional request field.
SESSIONSTATUS/Request

| | |
|---|---|
| CSeq: | int |
| Content-length: | int |
| MediaPath: | RtspSessionName/network### |
| Triplet: | 32 bit hex: 0xzzzzzzzz |
| NumSessions: | int |
| Frequency: | 32 bit unsigned int |
| Polarization: | lhcp, rhcp, horizontal, vertical |
| Standard: | dss, dvbs, dvbs2, amc |
| Modulation: | qpsk, 8psk |
| Symbol-Rate: | 32 bit unsigned int |
| Code-Rate: | 2-3, 6-7, etc. |
| Alpha: | int (0, 1, or 2) |
| Pilot: | true, false |
| Gold-Code: | int |
| Amc-Mode: | int |
| PLS: | 12 hex digits 010203040506070809101112 |
| Xport-Packets: | int |
| Low-Jitter: | true, false |
| Pids: | int, int, int |
| Destination-Address: | xx.xx.xx.xx |
| Destination-Port: | int-- |

A.2.4 Session Status Response Message

The fields requested in the session status request message must be included in the response message. All sessions for the requested triplet are sent in one response message. The number of sessions returned is specified by NumSessions. Sessions are 3-tuples grouped as (PIDs, destination address, destination port.) Also note that A3 parameter request fields (alpha, pilot, gold-code, amc-mode, & pls) are returned only if the triplet refers to a tuner in A3 mode.
SESSIONSTATUS/Response

| | |
|---|---|
| CSeq: | int |
| Content-length: | int |
| MediaPath: | RtspSessionName/network### |
| Triplet: | 32 bit hex: 0xzzzzzzzz |
| Frequency: | 32 bit unsigned int |
| Polarization: | lhcp, rhcp, horizontal, vertical |
| Standard: | dss, dvbs, dvbs2, amc |
| Modulation: | qpsk, 8psk |
| Symbol-Rate: | 32 bit unsigned int |
| Code-Rate: | 2-3, 6-7, etc. |
| Alpha: | int (0, 1, or 2) |
| Pilot: | true, false |
| Gold-Code: | int |
| Amc-Mode: | int |
| PLS: | 12 hex digits 010203040506070809101112 |
| Xport-Packets: | int |
| Low-Jitter: | true, false |
| NumSessions: | 3 |
| Pids: | int, int, int |
| Destination-Address: | xx.xx.xx.xx |
| Destination-Port: | int |

An example session request response, assuming a legacy tuner and the streamer has 3 active sessions:
SESSIONSTATUS/Response

| | |
|---|---|
| CSeq: | xxx |
| Content-length: | yyy |
| MediaPath: | SERVICEPROVIDERNAME/network0 |
| Triplet: | 0x00020549 |
| NumSessions: | 3 |
| Frequency: | 1353080000 |
| Polarization: | rhcp |

-continued

| Standard: | dss |
|---|---|
| Modulation: | qpsk |
| Symbol-Rate: | 20000000 |
| Code-Rate: | 6-7 |
| Xport-Packets: | 10 |
| Low-Jitter: | false |
| Pids: | 10, 11 |
| Destination-Address: | 239.255.0.17 |
| Destination-Port: | 1024 |
| Pids: | 30, 31 |
| Destination-Address: | 239.255.2.138 |
| Destination-Port: | 1024 |
| Pids: | 90, 91, 92 |
| Destination-Address: | 239.255.0.48 |
| Destination-Port: | 1024 |

Appendix B. Interesting Use Cases

A.1 Rain Fade

A.1.1 Some Tuners Affected

If a streamer gateway 10 detects a tuner unlock and free tuners are available, the streamer gateway 10 will move the RTP sessions to a free tuner in that chassis. Proxy server gateway 20 will not need to have knowledge of the movement. If no free tuners are available in that chassis or if they are all tried and fail, the streamer will indicate the triplet failure in the next STREAMERSTATUS response message. Once the streamer gateway 10 indicates failure, it must stop trying to move the session. Once a streamer gateway 10 has indicated triplet tune failure, proxy server gateway 20 will redirect the triplet to another streamer.

A.1.2 All Tuners Affected

It is possible that all tuners unlock in a rain fade. This could happen across all streamer gateways 10. Based on STREAMERSTATUS response the proxy server gateway 20 will mark a streamer gateway 10's triplet (slot) as error and update the slot time to the current time. If no slots are free across streamers the proxy will forward the new setup requests to the streamer gateway 10 with the oldest error slot. If proxy server gateway 20 tries all error slots yet STREAMERSTATUS continues to indicate failure, proxy server gateway 20 could send a 503: Service Unavailable message to the client device (e.g., STB 35). Current STB software does not alter its behavior upon reception of a 503: ServiceUnavailable response. Until it does, this proposed operation adds no value.

A.2 Static Tuning Failure

If a statically tuned tuner can not lock or loses lock, the streamer will NOT indicate a St: S0 failure in the STREAMERSTATUS response message. The streamer will continue to indicate St: S1. The streamer must continue to try to recover the statically tuned tuner.

A.3 Proxy Server Reboot

During a proxy server gateway 20 reboot all client STB cookies are lost. Following reboot the proxy server gateway 20 will respond with a 454: Session Not Found to a STB that issues a Setup request containing a previous (and now unknown) RTSP session number. In actual operation however, this does not seem to be a problem: while the proxy server gateway 20 is down, the STB TCP connection is reset and the STB issues new setup requests not containing a RTSP session number.

Appendix C. Design Notes

Streamer Gateways 10:

1. If a static tuner is free'd:
    a. If no RTP sessions exist for it, the tuner is silently returned to the pool. The streamer gateway 10 will stop reporting St: S1. No action is needed by proxy server gateway 20 except to detect the released static tuner and to delete the static slot.
    b. If RTP sessions exist, the streamer gateway 10 will silently move the triplet & sessions to a dynamic tuner if one is available. Proxy server gateway 20 must mark the previously static slot as a dynamic slot.
    c. If RTP sessions exist but the move fails, the streamer gateway 10 must send a StreamerStatus/Response msg to proxy server gateway 20 containing a triplet failed (D0) entry.
2. If a dynamically tuned tuner with RTP sessions is statically tuned to a different transponder:
    a. Triplet status will start to indicate the new statically tuned tuner. Proxy server gateway 20 must mark the previously dynamic slot as a static slot.
    b. If available, the streamer gateway 10 will silently move the dynamic RTP sessions to a free tuner. Triplet status will continue to indicate the dynamically tuned tuner.
    c. If a free tuner is not available, the streamer gateway 10 will return a "D0" status for the dynamic triplet that could not be moved. Proxy server gateway 20 will tear down all RTSP sessions for this triplet.
3. If proxy server gateway 20 sends a SessionAdd request for a new triplet and all tuners are allocated, the streamer gateway 10 will return a SessionAdd/Response message containing the triplet and non-zero failure code. (status code=0 indicates success.)
4. If proxy server gateway 20 sends a SessionUpdate or SessionDelete request for an unknown triplet, the streamer gateway 10 will return a SessionUpdate/Delete Response message containing the triplet and non-zero failure code.

Proxy Server Gateway 20:

1. If a streamer gateway 10 reports a failed triplet in the status response that is unknown to proxy server gateway 20, proxy server gateway 20 will tear down all sessions associated with that triplet. (proxy will send a to SessionDelete msg with the triplet and a DestinationAddress=255.255.255.255)
2. If a streamer gateway 10 reports a SessionAdd Response indicating failure, proxy server gateway 20 will internally tear down the triplet & sessions.
3. If a streamer gateway 10 reports a SessionAdd/Update/Delete Response indicating failure, proxy server gateway 20 will tear down the triplet.

As described herein, the present invention provides a method and apparatus for providing load balanced signal distribution to client devices in a network. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method, comprising:
receiving, via a gateway device, a request from a client device for downloading video from one of a plurality of video sources;
receiving, via the gateway device, respective load indicators from first and second video receiving devices capable of receiving the plurality of video sources in response to a rebooting operation of the gateway device;
selecting, via the gateway device, one of the first and second video receiving devices according to the load indicators; and
instructing, via the gateway device, the selected video receiving device to transmit the video from the one of the plurality of video sources using an address known by the client device, wherein the selected video receiving device transmits the video to the client device bypassing the gateway device.

2. The method of claim 1, further comprising the step of providing the address to the selected video receiving device.

3. The method of claim 1, further comprising the step of:
if one of the first and second video receiving devices is sending video from the one of the plurality of video sources using a multicast, sending a multicast network address to the client device, so that the client device can receive the video from the one of the plurality of video sources using the multicast network address.

4. The method of claim 1, further comprising the step of:
if one of the first and second video receiving devices is sending video from the one of the plurality of video sources using a unicast, requesting the sending video receiving device to convert the unicast into a multicast and sending a multicast network address to the client device, so that the client device can receive the video from the one of the plurality of video sources using the multicast network address.

5. The method of claim 1, wherein the gateway device polls the first and second video receiving devices for load indication information in accordance with a fixed and repetitive time interval and independently of any client device request.

6. The method of claim 1, wherein the respective load indicators indicate respective percentages of load set points for the first and second video receiving devices.

7. The method of claim 1, wherein each said video source provides a television program.

8. The method of claim 1, wherein the selected video receiving device has a lighter load according to the respective load indicators.

9. An apparatus, comprising:
a first input operative to receive a request from a client device for downloading video from one of a plurality of video sources;
a second input operative to receive respective load indicators from first and second video receiving devices capable of receiving the plurality of video sources in response to a rebooting operation of the apparatus;
first control logic operative to select one of the first and second video receiving devices according to the load indicators; and
second control logic operative to instruct the selected video receiving device to transmit the video from the one of the plurality of video sources using an address known by the client device, wherein the selected video receiving device transmits the video to the client device bypassing the apparatus.

10. The apparatus of claim 9, wherein:
if one of the first and second video receiving devices is sending video from the one of the plurality of video sources using a multicast, a multicast network address is sent to the client device, so that the client device can receive the video from the one of the plurality of video sources using the multicast network address.

11. The apparatus of claim 9, wherein:
if one of the first and second video receiving devices is sending video from the one of the plurality of video sources using a unicast, the sending video receiving device converts the unicast into a multicast and sends a multicast network address to the client device, so that the client device can receive the video from the one of the plurality of video sources using the multicast network address.

12. The apparatus of claim 9, further comprising third control logic operative to poll the first and second video receiving devices for load indication information in accordance with a fixed and repetitive time interval and independently of any client device request.

13. The apparatus of claim 9, wherein the respective load indicators indicate respective percentages of load set points for the first and second video receiving devices.

14. The apparatus of claim 9, wherein each said video source provides a television program.

15. The apparatus of claim 9, wherein the selected video receiving device has a lighter load according to the respective load indicators.

16. A method, comprising:
sending a load indicator from a video receiving device capable of receiving a plurality of video sources to a request server device, wherein the load indicator indicates a load associated with the video receiving device and the sending occurs in response to a rebooting operation of the request server device;
receiving at the video receiving device from the request server device, data indicating a requested program and a destination address of a client device associated with the requested program; and
transmitting the requested program from the video receiving device to the destination address of the client device wherein the requested program bypasses the request server device.

17. The method of claim 16, wherein each said video source is a television channel.

18. The method of claim 16, wherein the load indicator indicates a percentage load associated with the video receiving device.

19. The method of claim 16, wherein the receiving step is performed in response to the request server device determining that the video receiving device has a lowest load among a plurality of different video receiving devices.

20. The method of claim 16, wherein the video receiving device sends the load indicator to the request server device in response to a status request signal broadcast from the request server device in accordance with a fixed and repetitive time interval and independently of any client device request.

21. An apparatus, comprising:
control logic operative to determine a load indicator indicating a load associated with the apparatus, wherein the load indicator is provided in response to a request from a request server device upon a rebooting process of the request server device;
an interface operative to send the load indicator to the request server device; and wherein, in response to the load indicator, data indicating a requested program and a destination address of a client device associated with the requested program is received from the request server device, and the apparatus transmits the requested program to the destination address of the client device such that the requested program bypasses the request server device.

22. The apparatus of claim 21, wherein the apparatus is capable of receiving a plurality of television channels.

23. The apparatus of claim 21, wherein the load indicator indicates a percentage load associated with the apparatus.

24. The apparatus of claim 21, wherein the requested program and the address of the client device associated with the requested program is received from the request server device in response to the request server device determining that the apparatus has a lowest load among a plurality of different apparatuses.

25. The apparatus of claim 24, wherein the plurality of different apparatuses are video receiving devices.

26. The apparatus of claim 21, wherein the apparatus sends the load indicator to the request server device in response to a status request signal broadcast from the request server device in accordance with a fixed and repetitive time interval and independently of any client device request.

27. A method, comprising:
sending a request for a program from a client device to a request server device;
receiving an address at the client device from the request server device in response to the request;
receiving the requested program at the client device via a selected video receiving device using the address; and
wherein the request server device selects the selected video receiving device from a plurality of video receiving devices capable of receiving the requested program based on respective load indicators received from the plurality of video receiving devices, wherein the respective load indicators are provided by the plurality of video receiving devices in response to requests from the request server device upon a rebooting process of the request server device, and the selected video receiving device transmits the requested program to the client device such that the requested program bypasses the request server device.

28. The method of claim 27, wherein the respective load indicators indicate respective percentages of load set points for the plurality of video receiving devices.

29. The method of claim 27, wherein the plurality of video receiving devices are each capable of tuning a plurality of television channels.

30. The method of claim 27, wherein the selected video receiving device has a lighter load according to the respective load indicators.

31. An apparatus, comprising:
an output operative to send a request for a program to a request server device;
an input operative to receive an address from the request server device in response to the request, and to receive the requested program via a selected video receiving device using the address; and
wherein the request server device selects the selected video receiving device from a plurality of video receiving devices capable of receiving the requested program based on respective load indicators received from the plurality of video receiving devices, wherein the respective load indicators are provided by the plurality of video receiving devices in response to requests from the request server device upon a rebooting process of the request server device, and the selected video receiving device transmits the requested program to the apparatus such that the requested program bypasses the request server device.

32. The apparatus of claim 31, wherein the respective load indicators indicate respective percentages of load set points for the plurality of video receiving devices.

33. The apparatus of claim 31, wherein the plurality of video receiving devices are each capable of tuning a plurality of television channels.

34. The apparatus of claim 31, wherein the selected video receiving device has a lighter load according to the respective load indicators.

* * * * *